Inventors
Arthur T. Dawson,
George T. Buckham,
Dorsey F. Asbury,
By Bright & Bailey
Attorneys

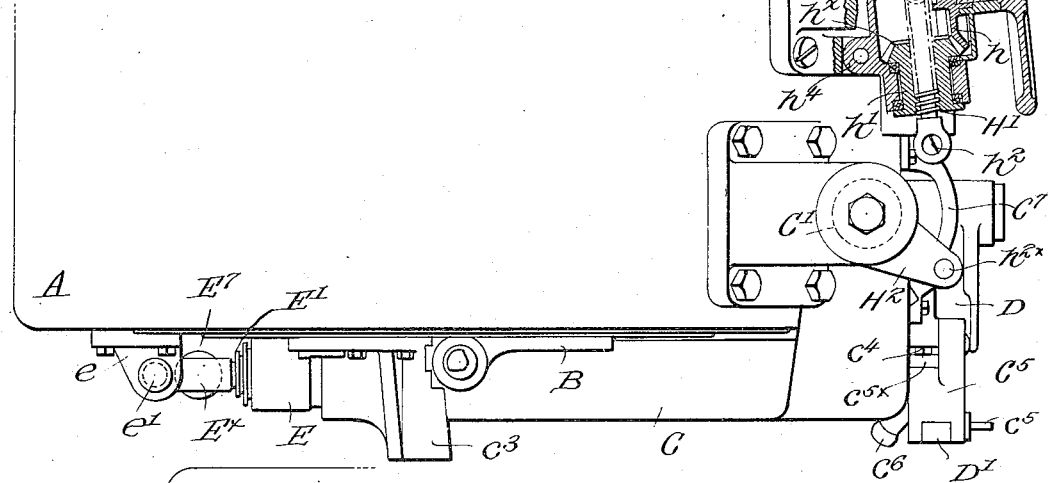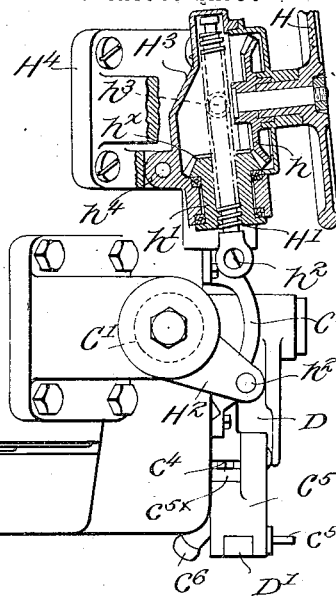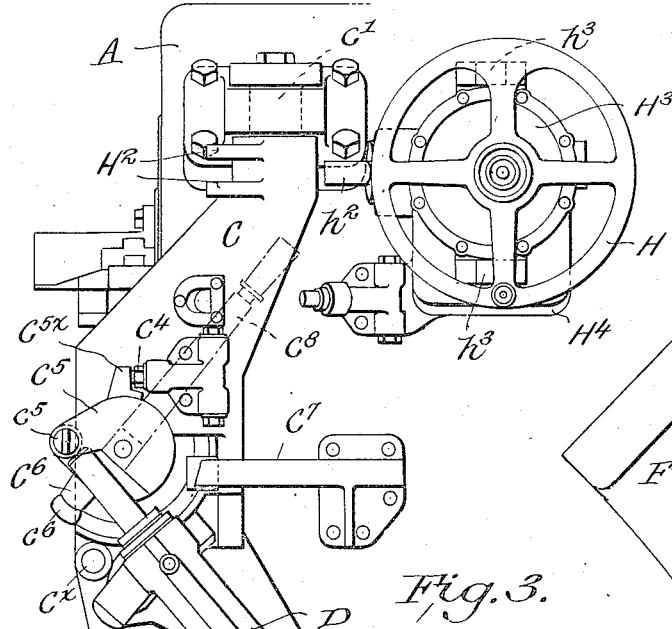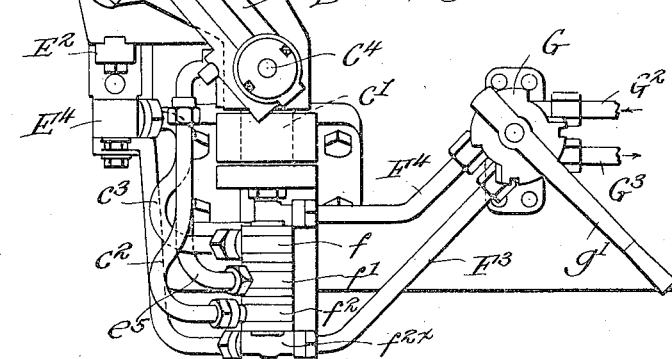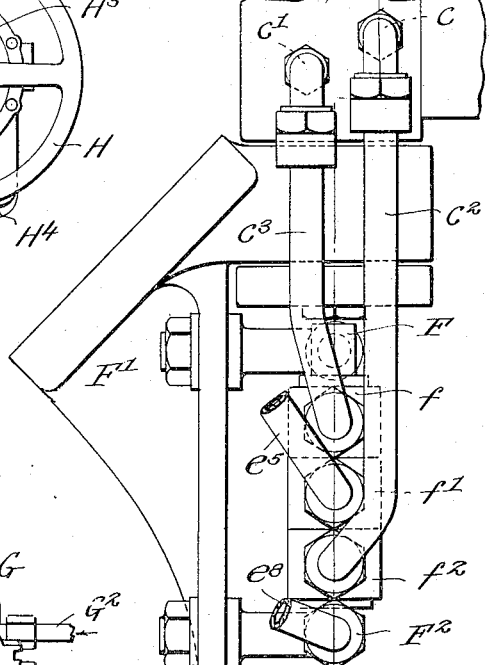

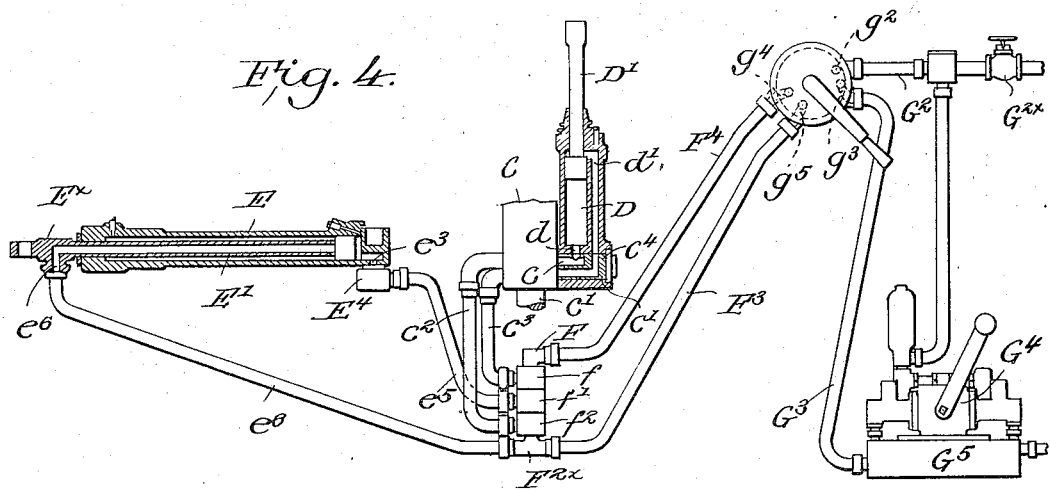
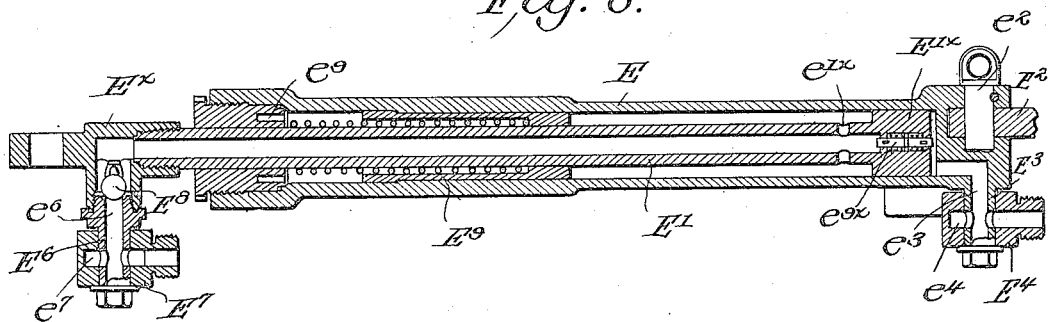
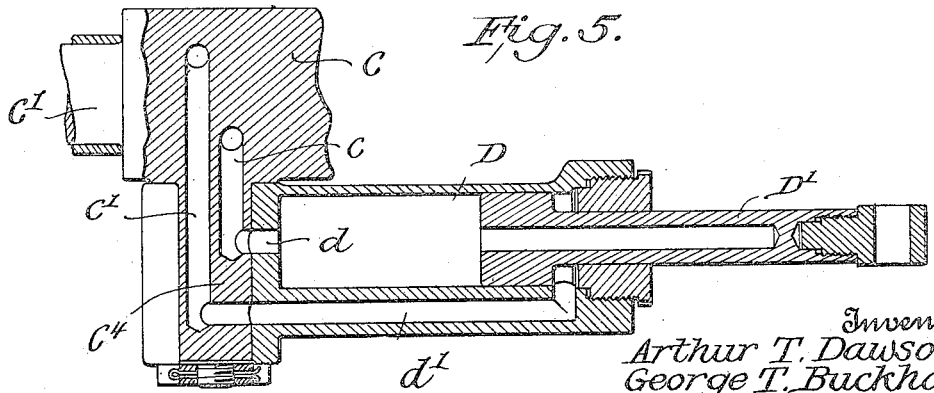

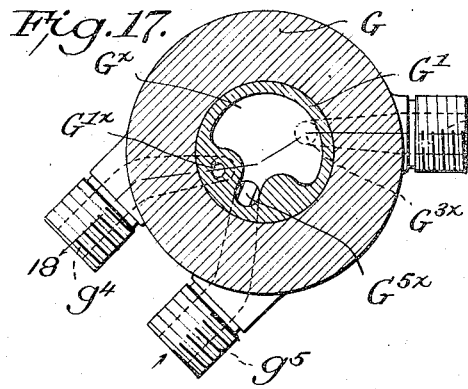
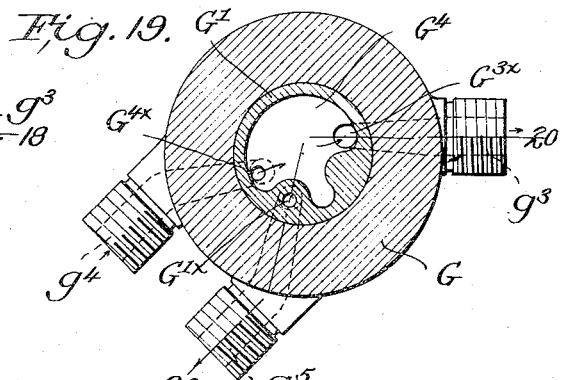
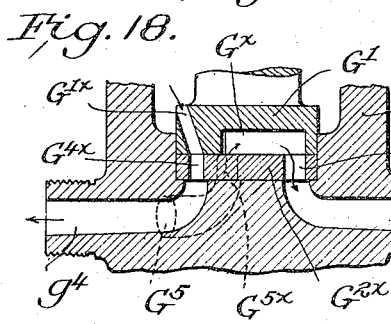
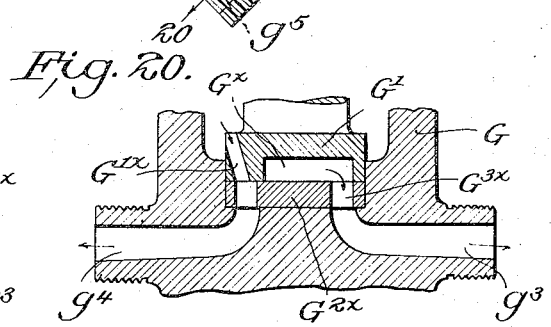
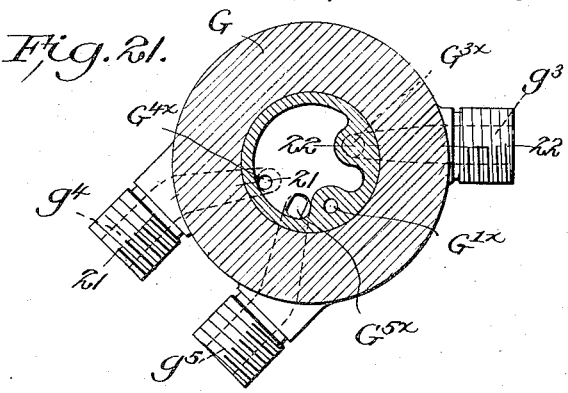
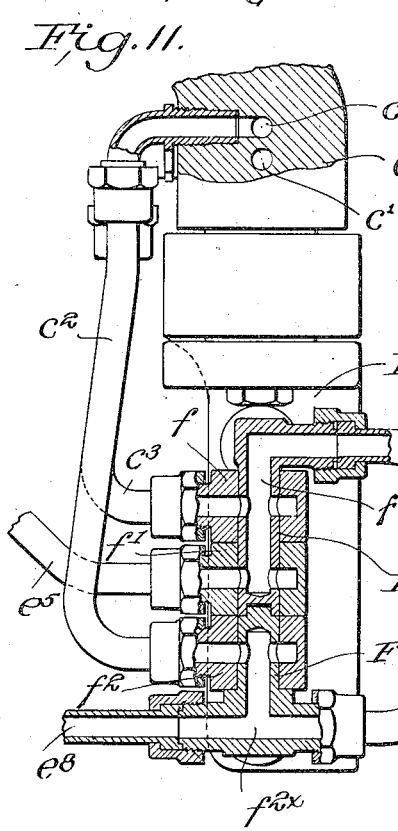
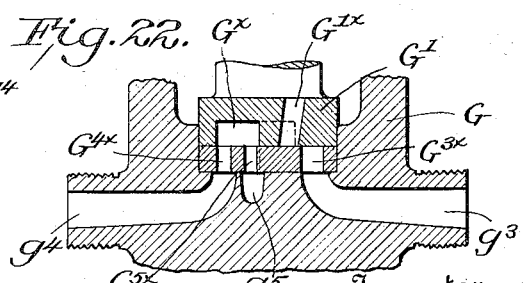
Inventors
Arthur T. Dawson,
George T. Buckham,
Dorsey F. Asbury,
By Bright & Bailey
Attorneys

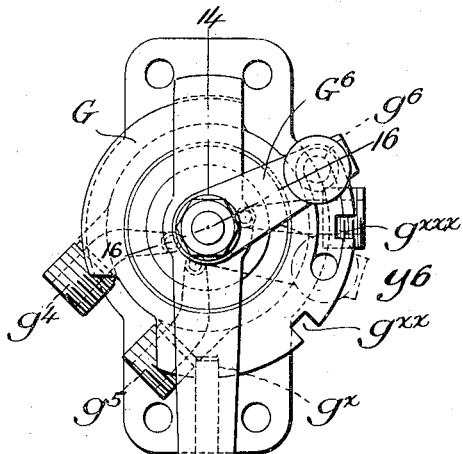
Fig. 12.
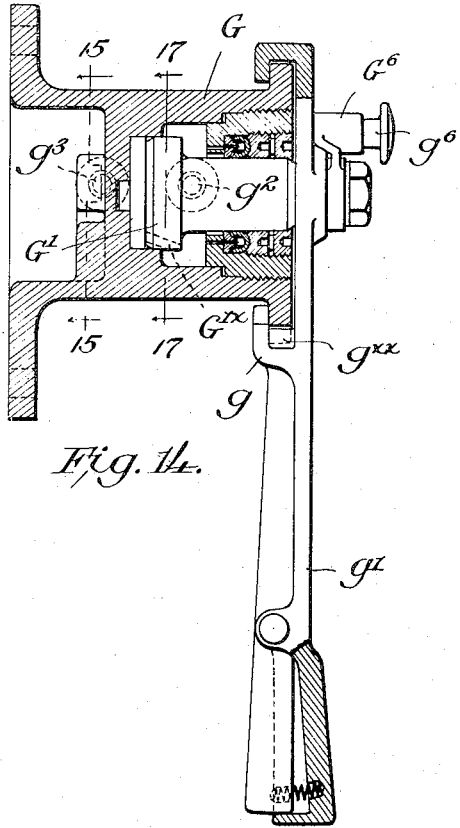
Fig. 14.
Fig. 13.
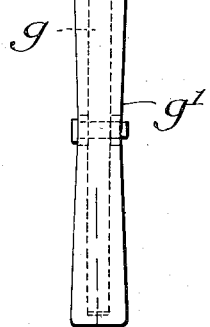
Fig. 15.
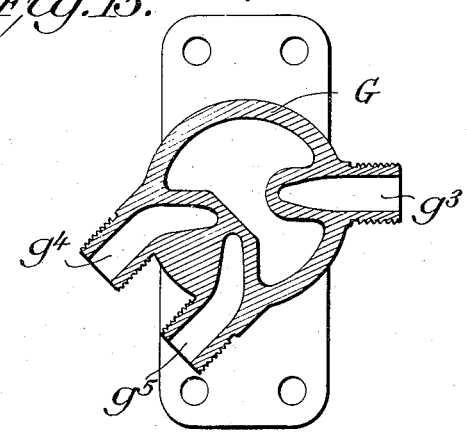
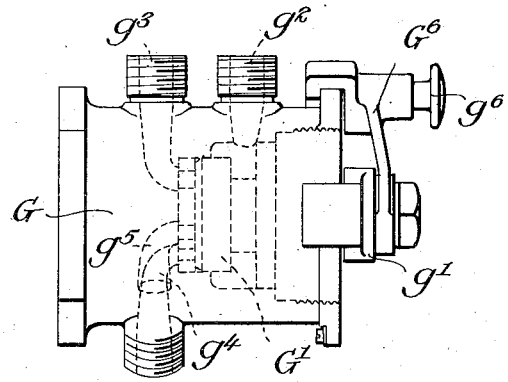
Fig. 16.
Inventors
Arthur T. Dawson,
George T. Buckham,
Dorsey F. Asbury,

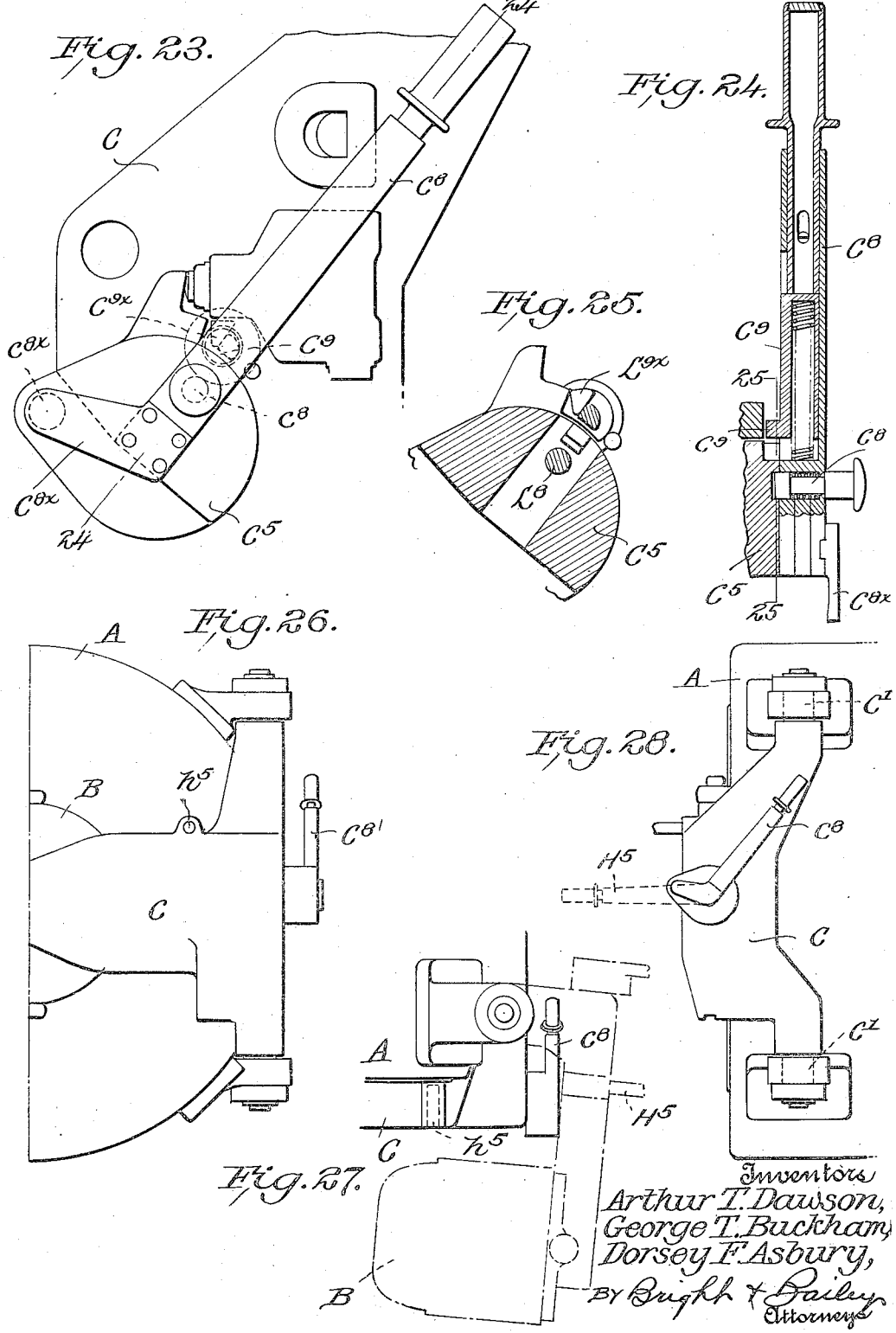

Patented Jan. 29, 1924.

1,482,118

UNITED STATES PATENT OFFICE.

ARTHUR TREVOR DAWSON AND GEORGE THOMAS BUCKHAM, OF WESTMINSTER, LONDON, ENGLAND, AND DORSEY FROST ASBURY, OF WASHINGTON, DISTRICT OF COLUMBIA, ASSIGNORS TO UNITED STATES ORDNANCE COMPANY, OF WASHINGTON, DISTRICT OF COLUMBIA, A CORPORATION OF VIRGINIA.

ORDNANCE BREECH MECHANISM.

Application filed September 20, 1923. Serial No. 663,867.

*To all whom it may concern:*

Be it known that we, ARTHUR TREVOR DAWSON, GEORGE THOMAS BUCKHAM, both subjects of the King of Great Britain, and DORSEY FROST ASBURY, a citizen of the United States of America, residing, respectively, at Vickers House, Broadway, Westminster, in the county of London, England; Vickers House, Broadway, Westminster, in the county of London, England; and National Savings and Trust Building, Washington, District of Columbia, United States of America, have invented certain new and useful Improvements in or Relating to Ordnance Breech Mechanism, of which the following is a specification.

This invention relates to ordnance breech mechanism of the swinging carrier type and is more particularly intended to be used in conjunction with the breech mechanism described and show in the specification and drawings of U. S. Patent 1,020,849, issued to G. L. Smith and D. F. Asbury March 19, 1912, distinctive features of which are a radially arranged crank-shaft mounted on the carrier for locking and unlocking the breech screw and a cam device interposed between the breech screw and the gun for initiating the locking displacement of the breech screw during the final portion of the closing movement of the carrier and for initiating the opening displacement of the carrier during the final portion of the unlocking movement of the breech screw.

According to the present invention we provide separate power operated elements of the ram or piston and cylinder type one of which is used for locking and unlocking the breech screw and the other is used for swinging the breech screw carrier to and from its closed position, the former operating between the carrier and the aforesaid radial crank-shaft or its equivalent and the other operating between the carrier and the breech end of the gun.

In order that the said invention may be clearly understood and readily carried into effect the same will now be described more fully with reference to the accompanying drawings, in which :—

Figures 1, 2 and 3 are respectively a rear elevation, a plan (with a part thereof in section) and a side elevation showing a breech mechanism constructed in accordance with our invention.

Figure 4 is a general view showing more or less diagrammatically the aforesaid cylinders and the means for controlling the supply of pressure fluid thereto.

Figure 5 is a section on a larger scale of the locking and unlocking cylinder and its parts.

Figure 6 is a view similar to Figure 5 of the swinging cylinder and its parts.

Figure 10 is a rear view of the pipe connections hereinafter referred to.

Figure 11 is a section taken approximately on the line 11—11 of Figure 10.

Figure 12 is an elevation of a control valve hereinafter referred to.

Figure 13 is a plan of Figure 12.

Figure 14 is a section taken approximately on the line 14—14 of Figure 12.

Figure 15 is a section taken approximately on the line 15—15 of Figure 14.

Figure 16 is a section taken approximately on the line 16—16 of Figure 12.

Figure 17 is a section taken approximately on the line 17—17 of Figure 14 and drawn to an enlarged scale.

Figure 18 is a section taken approximately on the line 18—18 of Figure 17.

Figure 19 is a view similar to Figure 17 showing the valve in another position.

Figure 20 is a section taken approximately on the line 20—20 of Figure 19.

Figure 21 is a view similar to Figure 17 showing the valve in still another position.

Figure 22 is a section. the right hand portion being taken approximately on the line 22—22 of Figure 21 and the left hand portion on the line 21—21 of Figure 21.

Figure 23 is an elevation showing a form of the hand lever employed for locking and unlocking the breech screw by hand.

Figure 24 is a section taken approximately on the line 24—24 of Figure 23, and

Figure 25 is a section taken approximately on the line 25—25 of Figure 24.

Figures 26, 27 and 28 are respectively a rear elevation, a plan and a side elevation showing diagrammatically an alternative arrangement for swinging the carrier by hand.

Figure 1:
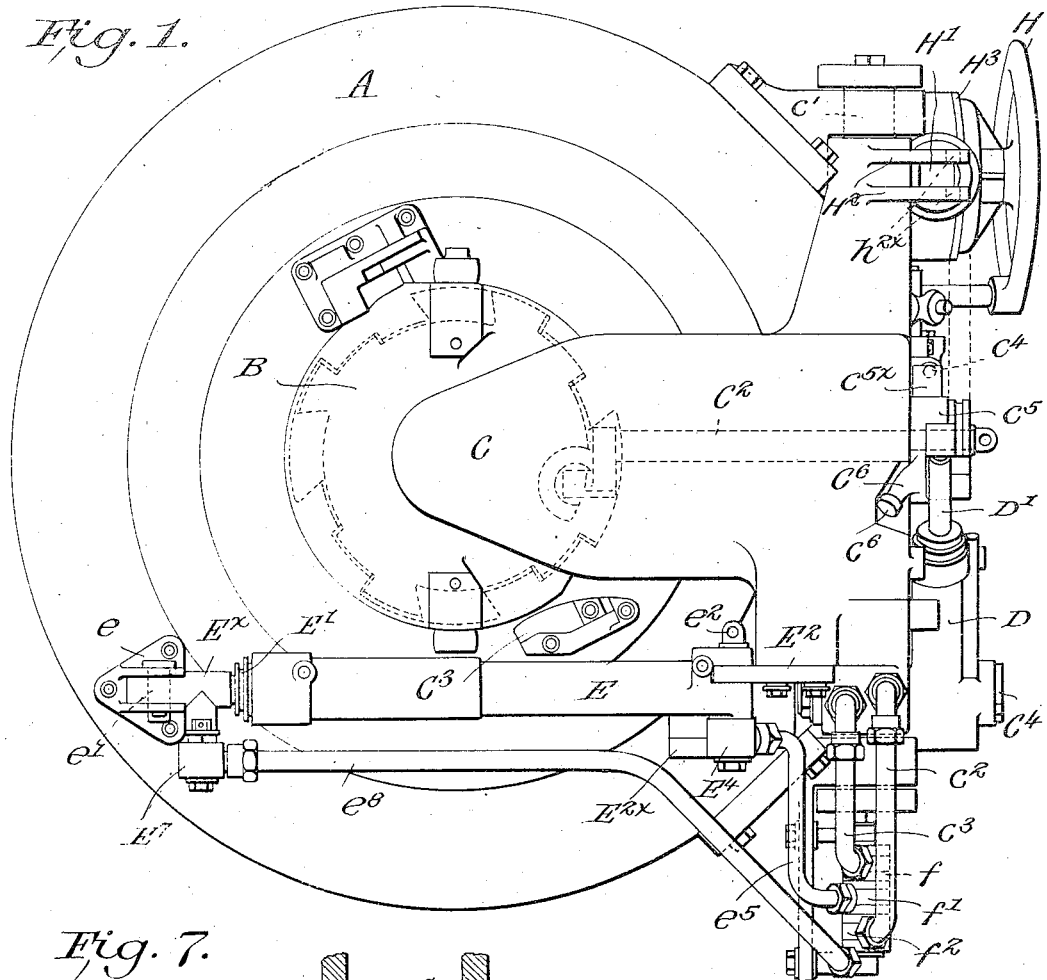

A is the breech end of the gun, B the breech screw, C the breech screw carrier and C' the hinge spigot of the said carrier. $C^2$ is the aforesaid radially arranged crank-shaft on the carrier, for locking and unlocking the breech screw and $C^3$ is the aforesaid cam device there being two such cam devices (see Figure 1) as is well understood. D represents the aforesaid locking and unlocking cylinder and D' its piston rod. E represents the aforesaid carrier-swinging cylinder and E' its piston rod.

The lower part of the locking and unlocking cylinder D is pivotally mounted on a spigot $C^4$ projecting laterally from the lower part of the carrier C. This spigot has ducts $c$, $c'$ (Figures 4, 5, 10 and 11) communicating at one end with pipes $c^2$, $c^3$ hereinafter referred to and at the other end with passages $d$, $d'$ in the cylinder D, the passage $d$ leading to the lower end of this cylinder and the passage $d'$ leading to the upper end. The piston rod D' is formed with a central bore as shown in Figure 5 to counteract the tendency to the formation of a vacuum in the cylinder D as a result of the sudden acceleration given to the piston when the aforesaid cam devices come into operation, this tendency being counteracted by the expansion of the air in the said central bore which air has been compressed during the swinging-in movement of the carrier. The upper end of the piston rod D' is pivotally connected by a pin $c^5$ to a sleeve $C^5$ which has its bearing in the carrier and to which the aforesaid axially arranged crank-shaft $C^2$ is keyed. This pin $c^5$ is arranged eccentrically with respect to the axis of the radial crank-shaft $C^2$ as shown in Figure 3. The position of the said pin is so chosen that when the breech screw is in the unlocked position the pin is almost on a dead centre, the turning moment on the crank $C^2$ thus being quite small although full pressure is on the piston. The crank sleeve $C^5$ has an arm $C^6$ carrying a roller $c^6$ which during the swinging movements of the carrier runs on a control arc $C^7$ attached to the side of the gun the object being to prevent the breech screw from turning in the locking direction while the carrier is swinging. The said dead centre has the effect of reducing to a minimum the friction between the roller $c^6$ and the control arc $C^7$. The sleeve $C^5$ may be provided with a detachable hand-lever $C^8$ (hereinafter described) for turning the breech screw by hand. A small hydraulic buffer $c^4$ is fitted on the carrier to absorb the blow of a sleeve stop face $c^{5x}$ before being arrested by the stop on the carrier at the termination of the locking movement of the breech screw. The pin $c^5$ may be made detachable so that the piston rod D' can be disconnected from the sleeve $C^5$ when the breech screw is being operated by hand. Under these conditions the pin $c^5$ is used for connecting the piston rod D' to the carrier, the said pin engaging in a hole $C^x$ (Figure 3) in the carrier.

Figure 7:
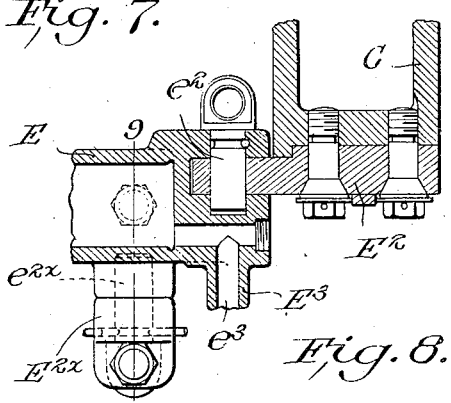
Figure 7 is a sectional rear elevation showing the connection between the swinging cylinder and the carrier.
Figure 9:
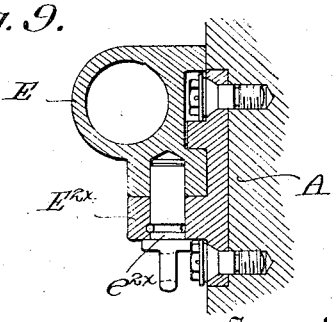
Figure 9 is a section taken approximately on the line 9—9 of Figure 7.
Figure 8:
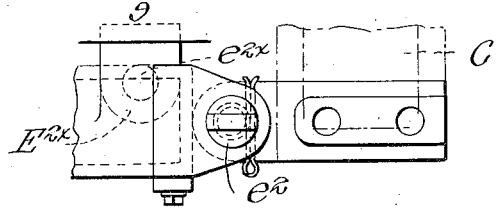
Figure 8 is a plan of Figure 7.

The carrier-operating cylinder E is pivotally connected by a large vertical pin $e^2$ to a bar or plate $E^2$ attached to the carrier C (see particularly Figures 6 to 7) and coaxially beneath this pin the said cylinder has a spigot $E^3$ provided with an axial passage $e^3$ communicating with a circular port $e^4$ formed in a sleeve $E^4$ in which this spigot is rotatably disposed. This sleeve carries a pipe $e^5$ through which pressure fluid is admitted in the manner hereinafter described to perform the opening movement of the carrier, the said pipe $e^5$ communicating with the port $e^4$. The said pin $e^2$ is made removable so that the cylinder E can be disconnected from the carrier for hand operation of the latter. Under these conditions the said pin may be utilized for connecting the cylinder to a bracket $E^{2x}$ on the gun as shown in Figure 9, the said pin being indicated in this position in Figure 9 and in Figures 7 and 8 by the reference $e^{2x}$ to avoid confusion. The piston rod E' is pivotally connected by a vertical pin $e'$ to a bracket $e$ on the breech end of the gun, this pin passing through a coupling piece $E^x$ attached to the end of the piston rod, and the piston rod is formed with an axial passage communicating at one end by lateral ports $e^{1x}$ with the interior of the cylinder E and at the other end with an axial passage $e^6$ formed in a spigot $E^6$ connected to the coupling piece $E^x$. This spigot piece is disposed in a sleeve $E^7$ having a circular port $e^7$ communicating with the axial passage $e^6$ and the said sleeve has a pipe $e^5$ which communicates with the said port $e^7$ and through which pressure fluid is admitted in the manner hereinafter described to perform the closing movement of the carrier. A ball valve $E^8$ (Figure 6) may be provided at the upper end of the axial passage $e^6$ for retarding the exhaust and regulating the speed of the carrier when moving to the open position, the exhaust passing through small ports in the seating for the ball as shown in Figure 6. Surrounding the piston rod $E^1$ there is a spring controlled sleeve $E^9$ (Figure 6) which works between the piston rod and the cylinder and acts as a buffer by gradually covering the lateral ports $e^{1x}$ and cutting off the exhaust. The stuffing box of the cylinder has a recess $e^9$ which, together with an extension of the said sleeve, forms a dashpot to absorb the remaining energy of the swinging mass, the sleeve being operated by the piston $E^{1x}$. A small relief valve $e^{9x}$ is provided in the piston to prevent the pressure from becoming unduly high on either side of the piston in the event of the carrier being suddenly stopped or reversed whilst swinging.

The aforesaid pipes $c^3$ and $e^5$ at their ends remote from the cylinders are connected to sleeves $f$ and $f^1$ rotatably carried by a spigot F connected to a bracket $F^1$ on the gun and the pipe $c^2$ is similarly connected to a sleeve $f^2$ rotatably carried by a spigot $F^2$ also connected to the bracket $F^1$. The said spigots are arranged axially in line with each other and with the pivotal axis of the carrier. The said spigots have independent axial passages $f^x$, $f^{2x}$, (Figure 11) the former communicating by separate lateral ports with circular passages in the sleeves $f$ and $f^1$ respectively and the axial passage $f^{2x}$ communicating by lateral ports with a circular passage in the sleeve $f^2$. The pipes $c^3$, $e^5$ and $c^2$ communicate with the said circular passages in the respective sleeves. The aforesaid pipe $e^8$ is connected to the lower spigot $F^2$ and communicates with the axial passage in the latter. This spigot is also connected to a supply pipe $F^3$ and the upper spigot is connected to another supply pipe $F^4$. It will be observed that by reason of the above described arrangement of the pipes and their associated parts it is possible to make these pipes rigid between their ends, the inherent flexibility of pipe $e^8$ permitting same to accommodate itself to slight change in the relative position of its end connections incident to swinging of the carrier. If desired however flexible pipes may be employed.

The pipes $F^3$ and $F^4$ lead to a casing G (see particularly Figures 12 to 16) containing a three-way valve $G^1$ by means of which the breech mechanism is controlled and from this casing a pipe $G^2$ leads to the pressure main and a pipe $G^3$ leads to exhaust. In the construction shown in Figure 4 a small hand operated pump $G^4$ is connected to the pipe $G^2$ for use in the event of the main hydraulic supply not being available. The supply for this pump is obtained from a small tank $G^5$. During power operation the exhaust water passes through this tank from the pipe $G^3$, thereby keeping it continually supplied for immediate use when the change to hand pump working is made. When the pump $G^4$ is in use a cock $G^{2x}$ on the pipe $G^2$ is closed.

The aforesaid valve $G^1$ is of the rotary type and is provided with a handle $g^1$ having a spring actuated catch $g$ for engaging with any one of three notches $g^x$, $g^{xx}$ and $g^{xxx}$ in the valve casing these notches corresponding respectively with the "Open", "Close" and "By-pass" positions of the valve. The aforesaid pressure pipe $G^2$ communicates with a passage $g^2$ in the valve casing and the aforesaid exhaust pipe $G^3$ communicates with a passage $g^3$ in the valve casing. Similarly the aforesaid pipes $F^3$, $F^4$ communicate with passages $g^5$, $g^4$ in the valve casing. The valve $G^1$ is constructed as shown in Figures 17 to 22 with a recess $G^x$ and with a hole $G^{1x}$ in constant communication with the pressure passage $g^2$ as will be seen from Figure 14. The said valve moves in contact with a seating $G^{2x}$ having holes $G^{3x}$, $G^{4x}$ and $G^{5x}$ communicating with the passages $g^3$, $g^4$ and $g^5$ respectively. When the handle $g^1$ is in the "Open" position shown in Figure 12 the valve $G^1$ occupies the position shown in Figures 17 and 18 so that the pressure passage $g^2$ is placed in communication with the passage $g^4$ through the holes $g^{1x}$ and $G^{4x}$ and the exhaust passage $g^3$ is placed in communication with the passage $g^5$ through the holes $G^{3x}$, $G^{5x}$ and the recess $G^x$. Consequently liquid under pressure will be admitted through the pipe $F^4$ the pipes $c^3$ and $e^5$ to the upper end of the cylinder D and to the right hand end of the cylinder E, and liquid will be exhausted from the opposite ends of these cylinders through the pipes $c^2$ and $e^8$ and the pipe $F^3$. The breech screw will therefore be unlocked and as soon as unlocking has been completed the breech screw carrier will be swung open. When the handle $g^1$ is moved to the "Close" position with the catch $g$ engaging with the second notch $g^{xx}$, the valve occupies the position shown in Figures 19 and 20 in which the pressure passage $g^2$ is placed in communication with the passage $g^5$ and the exhaust passage $g^3$ with the passage $g^4$. Consequently the pipe $F^3$ will be placed to pressure and the pipe $F^4$ to exhaust and the carrier will therefore be moved to the closed position and the breech screw locked, the locking movement of the breech screw being prevented as aforesaid by the control arc $C^7$ until the carrier is closed. When the handle $g^1$ is moved into the "By-pass" position with the catch $g$ engaging with the third notch $g^{xxx}$, the valve occupies the position shown in Figures 21 and 22 in which the lower end of the pressure hole $G^{1x}$ and the upper end of the exhaust hole $G^{3x}$ are closed and the passages $g^4$, $g^5$ are placed in communication with each other through the holes $G^{4x}$, $G^{5x}$ and the recess $G^x$, thereby permitting free circulation of the liquid in the cylinders D and E through the pipes $F^3$ and $F^4$, if it should be desired to operate the breech mechanism by hand without detaching the cylinder E and the piston rod $D^1$ from the operating parts as above described. A pivoted stop member $G^6$ is provided which can be moved from the position shown in full lines in Figure 12 into the position shown in broken lines in this figure. When the stop member is in the latter position it prevents the handle $g^1$ being unintentionally moved to the "By-pass" position during the hydraulic operation of the breech mechanism. The said stop member is retained in its said positions by a spring plunger $g^6$ engaging with holes in the valve casing. The "By-pass" position is only essential in the case of a breech mechanism in which the cylinder E and the piston rod $D^1$ are not detachable. For the breech mechanism herein described it is only necessary to have a two-way valve in which case, to operate by hand, the pressure must be cut off either by means of the cock $G^{2x}$ or by turning the valve lever into a neutral position.

The aforesaid breech screw operating hand-lever $C^8$ is mounted in grooves in the sleeve $C^5$ and is held in position by a spring plunger $c^8$ (see Figures 23, 24 and 25) engaging in a hole in the sleeve. This hand-lever has a guard $C^{8x}$ which covers the hole $c^{8x}$ in the sleeve for the reception of the aforesaid connecting pin $c^5$ and thereby prevents the insertion of the said pin into this hole to connect the piston rod $D^1$ to the sleeve when the said hand-lever is in position; the said guard also prevents the hand-lever $C^8$ from being placed in position until the pin $c^5$ is withdrawn to disconnect the piston rod $D^1$ from the sleeve $C^5$. Power operating cannot therefore be effected with the hand-lever in position. In the case of a breech mechanism having non-detachable cylinders in which the water circulates as aforesaid during hand operation, the hand-lever will not require to have this guard. The said hand-lever also carries a spring-controlled sliding member $C^9$ having a projection $c^9$ for engaging behind a stop-piece $c^{6x}$ on the carrier to hold the hand-lever in the locked position until the member $C^9$ has been depressed by hand against the resistance of its spring. The rear surface of the projection $c^9$ is rounded or bevelled (see Figure 25) to enable it to pass the stop-piece $c^{6x}$ on the return movement of the hand-lever to the position shown in Figure 23.

The manual operation of the breech mechanism is preferably performed by a hand wheel H (Figures 1, 2 and 3) connected by bevel wheels $h$, $h^x$ and a nut $h'$ to a quick-pitch screw $H^1$. The end of this screw is connected to lugs $H^2$ on the carrier by a pin passing through a hole $h^2$ in the end of the screw and through holes $h^{2x}$ in the lugs $H^2$, and a bracket $H^3$ on which the said gear is mounted is pivoted at $h^3$ to a bracket $H^4$ on the gun. This gear is used for moving the carrier only, the action of locking and unlocking the breech being performed by the hand-lever $C^8$ on the aforesaid crank sleeve $C^5$. When hydraulic power is to be used, the said gear is detached by removing the connecting pin from the lugs of the carrier and by connecting the bracket $H^3$ to a lug $h^4$ on the bracket $H^4$ by means of the said pin after the screw has been retracted to its full extent. This is the condition of affairs shown in Figures 1, 2 and 3. Instead of the said screw gear a horizontal lever $H^5$ inserted in a hole $h^5$ in the carrier may be employed as shown diagrammatically in Figures 26 to 28 for moving the carrier to its open and closed positions.

What we claim and desire to secure by Letters Patent of the United States is:—

1. In a gun, the combination of a swinging breech screw carrier, a rotatable breech screw, a crank shaft substantially radial with respect to the breech screw operating to lock and unlock the breech screw, and a motor on the carrier operatively connected to a crank on said shaft to effect rotation of said crank shaft.

2. In a gun, the combination of a swinging breech screw carrier, a rotatable breech screw, a crank shaft substantially radial with respect to the breech screw operating to lock and unlock the breech screw, a crank to operate said shaft, and a power device including a cylinder and piston, one of which is pivoted on the carrier and the other operatively connected to the crank on said shaft to effect rotation of the latter.

3. In a gun, the combination of a swinging breech screw carrier, a rotatable breech screw, a shaft substantially radial with respect to the breech screw operating to lock and unlock the breech screw, a crank to operate said shaft, and a cylinder and piston power device having its cylinder pivoted on the carrier and its piston operatively connected to the crank on said shaft to rotate the latter.

4. In a gun, the combination of a swinging breech screw carrier, a rotatable breech screw, and separate motors, one of which effects locking and unlocking of the breech screw and the other swinging of the carrier, the breech screw locking and unlocking motor having pivotal connection with the carrier and an operative pivotal connection with the breech screw, and the carrier swinging motor having pivotal connection with the gun and with the carrier.

5. In a gun, the combination of a swinging breech screw carrier, a rotatable breech screw, a spigot on the carrier, and a power device for locking and unlocking the breech screw, said power device including a cylinder and piston, one of which is pivotally mounted on said spigot, the latter having ducts for conveying motive fluid to and from the ends of the cylinder.

6. In a gun, the combination of a swinging breech screw carrier, a rotatable breech screw, a spigot on the carrier, and a cylinder and piston power device for locking and unlocking the breech screw, the cylinder of said device being pivotally mounted on said spigot and the latter having ducts for conveying motive fluid to and from the ends of the cylinder.

7. In a gun, the combination of a swinging breech screw carrier, a rotatable breech screw, a pair of hydraulic motors, one for locking and unlocking the breech screw and the other for swinging the carrier, and means including an air cavity in one of said motors into which the operating fluid for the motors is adapted to enter whereby an air cushion is provided to prevent hammer blows in the mechanisms which would be due to suddenly stopping opening movements of the mechanism.

8. In a gun, the combination of a swinging breech screw carrier, a rotatable breech screw, coacting cam devices on the gun and screw for effecting locking rotation of the screw during closing movement of the carrier, a breech screw locking and unlocking power device including a cylinder and piston, said piston having a cavity therein communicating with the interior of the cylinder from which cavity air is adapted to expand to counteract the tendency to the formation of a vacuum in the cylinder produced by sudden acceleration of the piston when said cam devices come into operation to effect locking of the breech screw.

9. In a gun, the combination of a swinging breech screw carrier, a rotatable breech screw, coacting cam devices on the gun and screw for effecting locking rotation of the screw during closing movement of the carrier, a breech screw locking and unlocking power device including a cylinder, piston and piston rod, said piston rod and piston having an axial bore communicating with the interior of the cylinder from which bore air is adapted to expand to counteract the tendency to the formation of a vacuum in the cylinder produced by sudden acceleration of the piston when said cam devices come into operation to effect locking of the breech screw.

10. In a gun, the combination of a swinging breech screw carrier, a rotatable breech screw, a pair of fluid operated motors, one for locking and unlocking the breech screw and the other for swinging the carrier, and means for supplying operating fluid under pressure to both of said motors at all times during opening and closing movements of the mechanism.

11. In a breech mechanism, the combination of a swinging breech screw carrier, a rotatable breech screw, means to hold said carrier against swinging movement during a predetermined amount of rotation of the breech screw, means to hold the breech screw against rotation during a predetermined amount of swinging movement of the carrier, a pair of fluid operated motors, one for locking and unlocking the breech screw and the other for swinging the carrier, and means supplying operating fluid under pressure to both of said motors at all times during opening and closing of the mechanism.

12. In a breech mechanism, the combination of a swinging breech screw carrier, a rotatable breech screw, a pair of fluid motors, one for locking and unlocking the breech screw and the other for swinging the carrier, means for supplying operating fluid under pressure to both of said motors at all times during opening and closing movements of the mechanism, and means nullifying the effectiveness of one of said motors to operate its related portion of the mechanism during a predetermined period when the other motor is effective to operate its related portion of the mechanism.

13. In a gun, the combination of a movable breech screw carrier, a rotatable breech screw, a radial crank shaft operating to lock and unlock the breech screw, a member on the crank shaft, and a breech screw locking and unlocking power device including a cylinder and piston, one of which is pivotally connected to the member on the crank shaft at a point disposed substantially on dead center when the breech screw occupies its unlocked position.

14. In a gun, the combination of a movable breech screw carrier, a rotatable breech screw, a radial crank shaft operating to lock and unlock the breech screw, a member on the crank shaft, and a breech screw locking and unlocking power device including a cylinder, piston and piston rod, said piston rod being pivotally connected to the member on the crank shaft at a point disposed substantially on dead center when the breech screw occupies its unlocked position.

15. In a gun, the combination of a swinging breach screw carrier, a rotatable breech screw, a radial crank shaft operating to lock and unlock the breech screw, a member on the crank shaft, a breach screw locking and unlocking power device including a cylinder, piston and piston rod, said piston rod being pivotally connected to said member to effect rotation of said crank shaft through said power device, a control arc on the gun, and a roller on said member cooperating with said control arc during swinging movements of the carrier.

16. In a gun, the combination of a swinging breech screw carrier, a rotatable breech screw, a radial crank shaft operating to lock and unlock the breech screw, a member on the crank, a breech screw locking and unlocking power device including a cylinder, piston and piston rod, a pin detachably engageable in a hole in the member to removably secure the piston rod to said member, and a hand lever detachably engageable with the member and provided with a guard covering said pin receiving hole when the hand lever is operatively engaged with the member.

17. In a gun, the combination of a swinging breech screw carrier, a rotatable breech screw, a carrier swinging power device including a cylinder, piston and piston rod, a spigot on the carrier upon which said cylinder is pivoted, said spigot having a duct by which motive fluid passes to one end of the cylinder, and a spigot on the gun upon which the piston rod is pivoted, said last named spigot having a duct by which motive fluid enters the other end of the cylinder through a passage in said piston rod.

18. In a gun, the combination of a swinging breech screw carrier, a rotatable breech screw, a spigot on the gun, a spigot on the carrier, and a fluid operated carrier swinging power device including a cylinder and piston, one of which is pivoted on the spigot on the gun and the other of which is pivoted on the spigot on the carrier, said spigots having ducts by which motive fluid enters the respective ends of the cylinder to operate said power device.

19. In a gun, the combination of a swinging breech screw carrier, a rotatable breech screw, a carrier-swinging power device including a cylinder, piston and piston rod, said piston rod having an axial passage and lateral ports connecting said passage with the cylinder to provide means for exhausting motive fluid from the cylinder on one side of the piston, and a spring controlled sleeve operating between the piston rod and cylinder during one stroke of the piston to gradually shut off the exhaust through said ports and thereby act as a buffer.

20. In a gun, the combination of a swinging breech screw carrier, a rotatable breech screw, a carrier swinging power device including a cylinder, piston and piston rod, a spring controlled sleeve operating between the piston rod and cylinder, and an extension on said sleeve cooperating with a recess in the end of the cylinder during the stroke of the piston incident to opening swing of the carrier to provide a dash-pot device whereby the energy of the swinging carrier is absorbed as the latter reaches open position.

21. In a breech mechanism, the combination of a swinging breech screw carrier, a rotatable breech screw, separate power devices each embodying a cylinder and piston, one of said devices effecting locking and unlocking of the breech screw and the other effecting swinging of the breech screw carrier to and from its closed position, and means to simultaneously place to pressure the necessary ends of both cylinders for opening and closing the breech mechanism and the opposite ends to exhaust.

22. In a gun, the combination of a swinging breech screw carrier, a rotatable breech screw, separate power devices each embodying a cylinder and piston, one of said devices effecting locking and unlocking of the breech screw and the other effecting swinging of the breech screw carrier to and from its closed position, a control valve, swivel pipe connections, and pipes leading from said valve and cylinders to said swivel pipe connections.

23. In a gun, the combination of a swinging breech screw carrier, a rotatable breech screw, separate power devices each embodying a cylinder and piston, one of said devices effecting locking and unlocking of the breech screw and the other effecting swinging of the breech screw carrier to and from its closed position, a control valve, swivel pipe connections having their axes of rotation coincident with the swinging axis of the carrier, and pipes leading from said valve and cylinders to said swivel pipe connections.

24. In a breech mechanism, the combination of a swinging breech screw carrier, a rotatable breech screw, separate power devices each embodying a cylinder and piston, one of said devices effecting locking and unlocking of the breech screw and the other effecting swinging of the breech screw carrier to and from its closed position, and means operable in one position to simultaneously place to pressure the necessary ends of the cylinders for opening and closing the breech mechanism and the opposite ends to exhaust, and in another position to place said cylinders in motive fluid communication with each other to permit the breech mechanism to be operated by hand.

25. In a breech mechanism, the combination of a swinging breech screw carrier, a rotatable breech screw, separate power devices each embodying a cylinder and piston, one of said devices effecting locking and unlocking of the breech screw and the other effecting swinging of the breech screw carrier to and from its closed position, a valve operatively connected with said cylinders effective in one position to simultaneously place to pressure the necessary ends of the cylinders for opening and closing the breech mechanism and the opposite ends to exhaust, and in another position to place said cylinders in motive fluid communication with each other to permit the breech mechanism to be operated by hand, and an adjustable stop device positionable to prevent the control valve being moved to the last named position.

26. In a gun, the combination of a swinging breech screw carrier, a rotatable breech screw, means for effecting locking and unlocking of the breech screw, and a hand operated device for swinging the carrier, said device being pivoted on the gun for swinging movement with respect thereto and including a screw threaded member adapted to be detachably connected to the carrier.

ARTHUR TREVOR DAWSON.
GEORGE THOMAS BUCKHAM.
DORSEY FROST ASBURY.